3,421,132
SHEAR LOAD CELL
Edgar J. Jones, Weston, Mass., assignor to Instron
  Corporation, Canton, Mass., a corporation of
  Massachusetts
Original application Feb. 17, 1965, Ser. No. 433,351, now
  Patent No. 3,320,569. Divided and this application
  Jan. 19, 1967, Ser. No. 623,786
U.S. Cl. 338—5          8 Claims
Int. Cl. G01l 1/22

ABSTRACT OF THE DISCLOSURE

A cylindrical strain gauge shear load cell with an axial central cavity and circumferentially spaced loading, support and intermediate thinner gauge portions.

---

This is a division of application Ser. No. 433,351, filed Feb. 17, 1965, now Patent No. 3,320,569.

This invention relates to load cells, and more particularly to such devices in which strain gauges provide a signal responsive to forces, in the load cells, in shear. (Cf. Pien United States Patent No. 3,037,178, May 29, 1962.)

A primary object of the invention is to provide load cells that are not only simple in construction, but as well provide both great linearity in use and small deflection load ratios.

The invention features in its broadest aspect provision of a load cell embodying a cell unit with loading portions and support portions separated by thinner intermediate gauging portions, the latter including gauging surfaces defined by lines parallel to the axis of load and extending for the full height of the load cell unit.

Other objects, advantages, and features will appear from the following description of preferred embodiments, taken together with the attached drawings thereof, in which.

Figure 1:
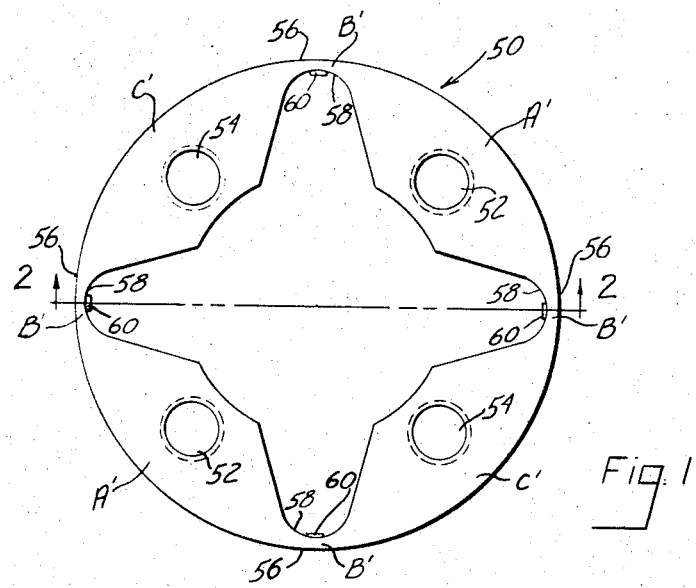
FIG. 1 is a plan view of an embodiment of the invention.
Figure 2:
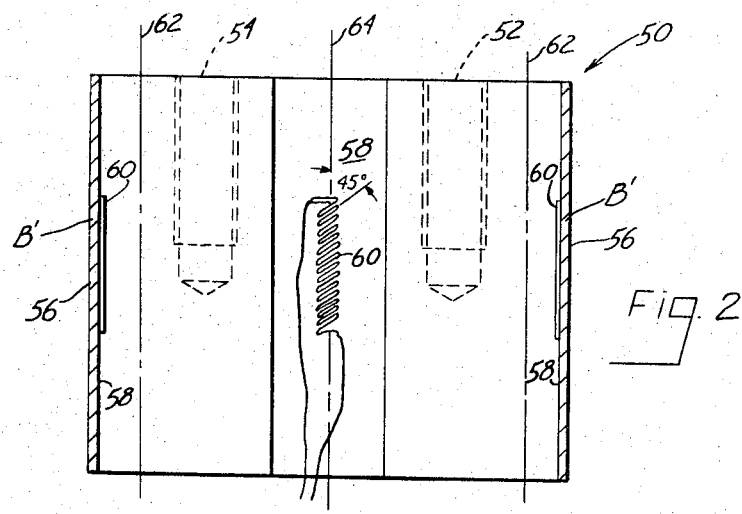
FIG. 2 is a sectional view at 2—2 of FIG. 1.

FIGS. 1 and 2 illustrate an embodiment of the present invention. The unit, designated 50, comprises a hollow member of cylindrical exterior, with, integrally, a plurality of circumferentially spaced support portions A'; loading portions C'; and thinner intermediate gauging portions B'. The support and loading portions each include a tapped hole (52 or 54 respectively) for securing the load cell to adjacent loading and support members. Each gauging portion B' includes a pair of shear faces 56 and 58, faces 56 being defined by portions of the external surface of the cylindrical member and each of faces 58 being defined by portions of the cylindrical surfaces formed by a hole drilled vertically through the load cell with its axis 62 parallel with the axis 64 of the cylindrical member. A resistance strain gauge 60 is bonded to each of faces 58 with its strain sensitive filaments lying at a 45° angle to axes 62 and 64. As the strains in alternate gauging portions are in opposite directions, all gauges are mounted with their filaments pointing in the same direction.

In effect, load cell 50 comprises a plurality of cantilever beams which have been wrapped into an annulus.

Load cell 50 obtains the desired low deflector-to-strain ratio by providing a thick member with thin gauging portions. Since the deflection of a cantilever beam varies directly with the cube of its length, inversely with the cube of its height, and inversely with its width, its deflection will be best minimized by decreasing length and increasing height. Shear strain varies inversely with height and width. The lowest deflection-to-strain ratio is obtained by maximizing height and minimizing width, i.e., by removing vertical, as opposed to horizontal, portions of the beam, to provide one or more shear surfaces on at least certain of which the strain gauges are mounted.

Other embodiments within the appended claims will occur to those skilled in the art.

I claim:
1. A shear load cell for measuring the magnitude of an applied load comprising, in combination:
   a cylindrical member with a central cavity extending axially through said member and including, integrally a plurality of circumferentially spaced loading portions, a support portion intermediate each pair of said loading portions and a thinner gauging portion intermediate each of said loading and support portions; and,
   a strain gauge bonded to each of said gauging portions, each said gauge being oriented to measure strains in shear in said gauging portions.
2. A shear load cell for measuring the magnitude of an applied load comprising, in combination:
   a cylindrical member with central cavity extending axially through said member and including integrally, a plurality of circumferentially spaced loading portions, a support portion intermediate each pair of said loading portions and a thinner gauging portion intermediate each of said loading and support portions; and,
   a strain gauge bonded to each of said gauging portions with the strain sensitive filaments of each said gauge disposed at an angle of 45° relative to the axis of said cylindrical member.
3. A shear load cell for measuring the magnitude of an applied load comprising, in combination:
   a cylindrical member with, integrally, a plurality of circumferentially spaced loading portions, a support portion intermediate each pair of said loading portions and a thinner gauging portion intermediate each of said loading and support portions,
   said loading and said support portions including, respectively, spaced loading and support areas perpendicular to the axis of said cylindrical member,
   each of said gauging portions including a shear face perpendicular to said areas; and,
   a strain gauge bonded to each of said shear faces, each gauge being oriented to measure strains in shear in said gauging portions.
4. A shear load cell for measuring the magnitude of an applied load comprising, in combination:
   a cylindrical member with, integrally, a plurality of circumferentially spaced loading portions, a support portion intermediate each pair of said loading portions and a thinner gauging portion intermediate each of said loading and support portions,
   said loading and said support portions including, respectively, spaced loading and support areas perpendicular to the axis of said cylindrical member,
   each of said gauging portions including a shear face perpendicular to said areas; and,
   a strain gauge bonded to each of said gauging portions with the strain sensitive filaments of each said gauge disposed at an angle of 45° relative to the axis of said cylindrical member.
5. A shear load cell for measuring the magnitude of an applied load comprising, in combination:
   a cylindrical member with, integrally, a plurality of circumferentially spaced loading portions, a support portion intermediate each pair of loading portions and a thinner gauging portion intermediate each of said loading and support portions,
   said loading and said support portions including, respectively, spaced loading and support areas disposed perpendicular to the axis of said cylindrical member, each of said gauging portions including a pair of shear faces perpendicular to said areas, one of each pair of said shear faces being defined by a portion of the external surface of said cylindrical member; and, a strain gauge bonded to one of each pair of said shear faces, each said gauge being oriented to measure strains in shear in said gauging portions.

6. The load cell of claim 5 in which each said strain gauge is bonded to said shear faces with the strain sensitive filaments of each said gauge disposed at an angle of 45° relative to the axis of said cylindrical member.

7. A shear load cell for measuring the magnitude of an applied load comprising, in combination:
   a cylindrical member with, integrally, a plurality of circumferentially spaced loading portions, a support portion intermediate each pair of loading portions and thinner gauging portions intermediate each of said loading and support portions,
   said loading and said support portions including, respectively, spaced loading and support areas perpendicular to the axis of said cylindrical member,
   each of said gauging portions including a pair of shear faces perpendicular to said areas, one of each pair of said shear faces being defined by a portion of the external surface of said cylindrical member and the other of each pair of said shear surfaces being defined by a portion of a cylindrical cavity extending through said cylindrical member with the central axis of said cavity perpendicular to said areas; and,
   a strain gauge bonded to one of each pair of said shear faces, each said gauge being oriented to measure strains in shear in said gauging portions.

8. The load cell of claim 7 in which each said strain gauge is bonded to said shear faces with the strain sensitive filaments of each said gauge disposed at an angle of 45° relative to the axis of said cylindrical member.

References Cited
UNITED STATES PATENTS

| | | |
|---|---|---|
| 2,859,613 | 11/1958 | Green. |
| 2,866,059 | 12/1958 | Laimins. |
| 3,315,203 | 4/1967 | Jacobson. |

REUBEN EPSTEIN, *Primary Examiner.*